United States Patent [19]

Alsop

[11] Patent Number: 4,482,512

[45] Date of Patent: Nov. 13, 1984

[54] MAKING SILICON CARBIDE BODIES

[75] Inventor: John E. Alsop, Billericay, England

[73] Assignee: Morganite Special Carbons Limited, London, England

[21] Appl. No.: 463,889

[22] PCT Filed: May 25, 1982

[86] PCT No.: PCT/GB82/00151

§ 371 Date: Jan. 21, 1983

§ 102(e) Date: Jan. 21, 1983

[87] PCT Pub. No.: WO82/04248

PCT Pub. Date: Dec. 9, 1982

[30] Foreign Application Priority Data

May 29, 1981 [GB] United Kingdom ............... 8116551

[51] Int. Cl.$^3$ ...................... C04B 35/56; C01B 31/36
[52] U.S. Cl. .................................. 264/29.1; 264/60; 264/63; 264/65; 423/345; 501/88
[58] Field of Search ..................... 423/345; 501/88; 264/29.1, 60, 63, 65

[56] References Cited

U.S. PATENT DOCUMENTS 4,325,930 4/1982 Vallet ................................. 423/345
4,364,974 12/1982 Lask .................................. 423/345

FOREIGN PATENT DOCUMENTS 2043111 10/1980 United Kingdom .

Primary Examiner—Jack Cooper
Attorney, Agent, or Firm—William R. Hinds

[57] ABSTRACT

Reaction-bonded SiC is made by steps which include preparing a porous preform of particulate SiC and a carbon yielding binder, heating the preform in to convert the binder to carbon, and while the preform in a vacuum or inert atmosphere is in contact with a compacted silicon cake made from particulate silicon and a carbon yielding binder, to cause melting and migration into the preform of silicon from the silicon cake, wherein the silicon cake is made essentially of silicon metal in flake form and the binder, and the binder when mixed with the silicon is in such liquid state that it forms a coating on the surfaces of substantially all the silicon flakes.

6 Claims, No Drawings

MAKING SILICON CARBIDE BODIES

This invention relates to making silicon carbide bodies and provides an improved method of making reaction-bonded, silicon carbide bodies.

It is known, from Published U.K. Patent Application No. 2 043 111 A, to make a reaction-bonded silicon carbide body by processes which include the steps of preparing a porous preform compising compacted particulate silicon carbide and a carbon-yielding binder, heating the preform firstly to convert the binder to carbon and secondly, while the preform in a vacuum or inert atmosphere is in contact with a source of silicon in the form of a compacted silicon cake, made from ingredients including particulate silicon and a carbon-yielding binder, to cause melting and migration into the preform of silicon from the silicon cake.

According to the present invention, in a method of making a reaction-bonded silicon carbide body by a process comprising the above steps, the silicon cake is made essentially only of silicon metal in flake form and the binder, the amount of binder used in making the silicon cake being at least 10% by weight of the silicon, and the binder, when mixed with the silicon, is in such liquid state that it wets the silicon substantially throughout and provides a coating of binder on surfaces of substantially all the silicon flakes.

In all the processes described in the above-mentioned Specification No. 2 043 111 A, the silicon source is a silicon-carbon mixture containing finely divided elemental carbon, preferably including an organic binder which yields carbon on heating, and in the form of a "compact". In the present specification the term "silicon cake" is used to distinguish from the silicon carbide preform which is also called a "compact" in Specification No. 2 043 111 A.

It is a surprising and advantageous feature of the present invention that finely divided elemental carbon is not an essential ingredient of a silicon source to be used in contact with a silicon carbide preform to be reaction bonded by heating.

Since the binder is the only carbon source in the silicon cake and wets the silicon throughout, there is no requirement for effecting uniform dispersal of finely divided elemental carbon through the silicon particles, so that an ingredient and a production step are saved, and furthermore it is found that, on heating the silicon cake, there evolves a silicon carbide cage structure stable enough to withstand, during the reaction, the load of stacked preforms and silicon cakes but not so stable as to impede migration of molten silicon from the cake into the preform or, on completion of the process, to prevent easy removal of the silicon carbide cage as a friable residue in cleaning or finish-machining of the preforms.

The binder used in the silicon cake is preferably a water soluble binder, so that it can be diluted to ensure wetting of the silicon flake, and in particular sodium lignone sulphonate.

The following is an example of the way in which the invention can be carried out.

EXAMPLE

All quantities in percentage parts by weight. Manufacture of a silicon impregnated reaction-bonded silicon carbide body.

1. SILICON CARBIDE PREFORM

Raw Materials 40 parts: Silicon Carbide 25u particle size
40 parts: Silicon Carbide 13u particle size
20 parts: Z2E Pitch (soft) 105 ring and ball (may be diluted with tar oil to improve mixing)

Process (a) 100 lbs. above mix wet milled, using pebbles +10% wt. iron balls with 7 gals. water and 1% SK (Sodium Lignone Sulphonate) as milling aid. Milled for 3½ to 4 hours.
Resulting slurry is allowed to stand for 48 hours. Supernatant is decanted, wet cake mixed cold, dried overnight at 100°–105° C. in an air drier. The dried cake is hammer milled and sieved to 180 mesh (about 58u).

(b) Yield approximately 80% wt. of passing 180 mesh powder.

(c) Powder pressed into preform blanks—10 ton/sq. in. producing Green density of order 1.94–1.96.

(d) Kilned in induction furnace 50° C./hr. to 700° C. Kilning drives off pitch volatiles, converts pitch to pitch coke, gives a machinable preform.

(e) Machining Preform machined to size approximately 0.25 to 1 mil oversize on each dimension.

2. MANUFACTURE OF SILICON CAKE

Raw Materials

86–90 parts: Silicon metal in flake form, passing 18 mesh retained on 36 mesh (approx. 516u to 280u)
14–10 parts: SK with water to dissolve Process Silicon metal hot mixed with water containing dissolved SK, so that Silicon is uniformly coated with SK. Dried, passed through 12 mesh screen (less than 725u) and pressed into compacted cake.

3. CONVERSION PROCESS

The Silicon cakes are preferably made of the same diameter as the SiC preforms with a weight of Silicon about 1.5× weight of preform. Utilization of Silicon in process is governed by a number of factors including porosity, i.e. kilned density of preform, and carbon content of preform. It has been found that in general utilization of Silicon is about 50% and therefore 2× theoretical amount required.

Silicon cakes of required size and SiC preforms are stacked for kilning, commencing with SiC preform and ending with SiC preform. Preferably, the Silicon cakes contact or cover the whole opposed surface of the SiC preform.

The assembly of preforms and compacts is placed in a carbon crucible in an induction furnace, with various carbonaceous materials as oxygen scavengers. Purged with Argon and heated.

The first stage of conversion is melting of the silicon metal within the cake and reaction of some of the silicon metal with the carbon derived from the binder (SK) to form a silicon carbide cage in the cake. The second stage, which occurs when the surface tension of the silicon is low enough i.e. at about 1650° C., is the migration of free silicon into the preform where it fills the available pores and reacts exothermically with carbon in the preform. This second stage reaction takes about 2–10 seconds for each preform in the stack and propagates from the hottest point in the furnace. The third stage of conversion is continuation of heating to approximately 2000° C. for a further 20–30 minutes to ensure complete conversion of carbon in the preform to silicon carbide.

The total time for the three conversion stages is about 2½–3 hours.

After completion of the heating, the stacked preforms are allowed to cool to room temperature in an inert atmosphere.

4. PRODUCT

The product is a stack of preforms, that can generally be hand separated, with intervening silicon cake residue which is a very friable, highly porous silicon carbide structure from which the silicon has run out. Rough brushed, excess Silicon metal dissolved in aqueous 20% wt./vol. caustic soda at 100° C.

| Typical Products: | Rings of 60 mm outside diameter 40 mm inside diameter 10 mm thickness |
|---|---|
| Density | 2.9 |
| Carbon | 0.0 |
| Silica | 1.8 |
| Silicon | 20–25 |
| Silicon Carbide | 70–78 |
| Ferrosilicon | 0.9 |
| Residual closed porosity approx. | 1.0 |

I claim:

1. A method of making a reaction-bonded silicon carbide body by steps which include preparing a porous preform comprising compacted particulate silicon carbide and a carbon-yielding binder, heating the preform to convert the binder to carbon and, while the preform in a vacuum or inert atmosphere is in contact with a source of silicon in the form of a compacted silicon cake, made from ingredients including particulate silicon and a carbon-yielding binder, to cause melting and migration into the preform of silicon from the silicon cake, characterised thereby that the silicon cake is made essentially only of silicon metal in flake form and the binder, the amount of binder used in making the silicon cake being at least 10% by weight of the silicon, and the binder, when mixed with the silicon, is in such liquid state that it wets the silicon substantially throughout and provides a coating of binder on surfaces of substantially all the silicon flakes.

2. A method according to claim 1, characterised thereby that the binder used in the silicon cake is water soluble.

3. A method according to claim 2, characterised thereby that the binder is sodium lignone sulphonate.

4. A method according to claim 3, in which the silicon content of the silicon cake is about twice the theoretical amount required for conversion to silicon carbide of the carbon content of the preform.

5. A method according to claim 2, in which the silicon content of the silicon cake is about twice the theoretical amount required for conversion to silicon carbide of the carbon content of the preform.

6. A method according to claim 1, in which the silicon content of the silicon cake is about twice the theoretical amount required for conversion to silicon carbide of the carbon content of the preform.

* * * * *